April 21, 1925.
W. J. SEELINGER
1,534,814
VEHICLE BODY CONSTRUCTION
Filed June 2, 1921    4 Sheets-Sheet 1
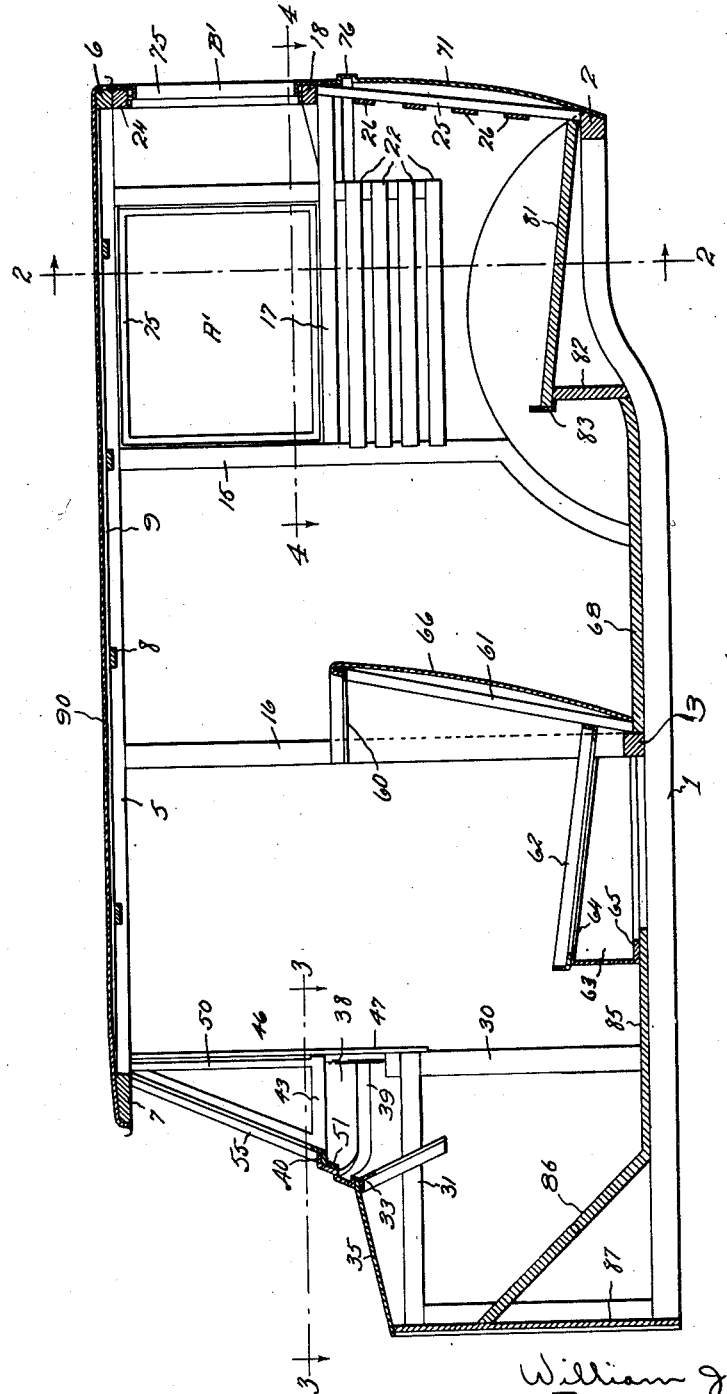

April 21, 1925.  1,534,814
W. J. SEELINGER
VEHICLE BODY CONSTRUCTION
Filed June 2, 1921   4 Sheets-Sheet 2
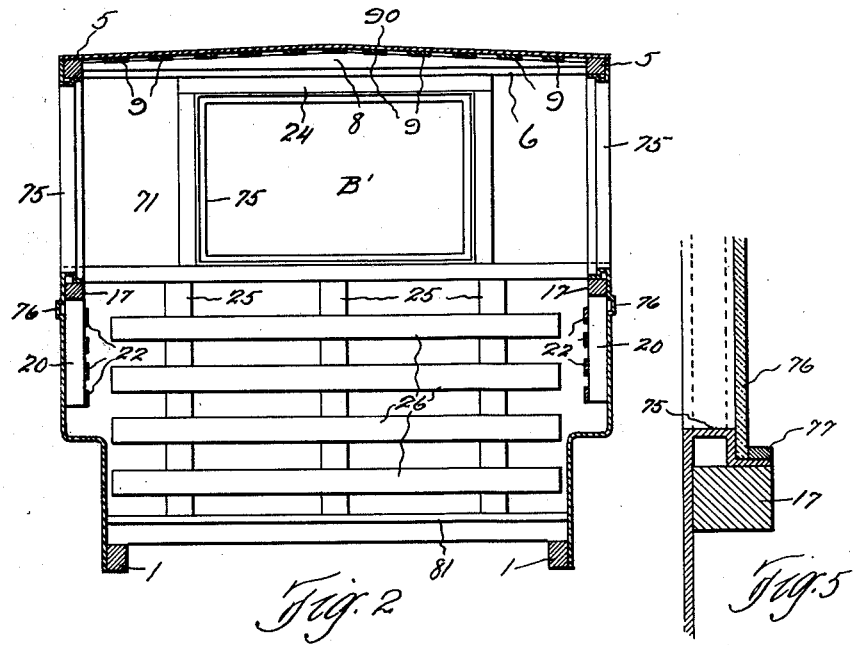
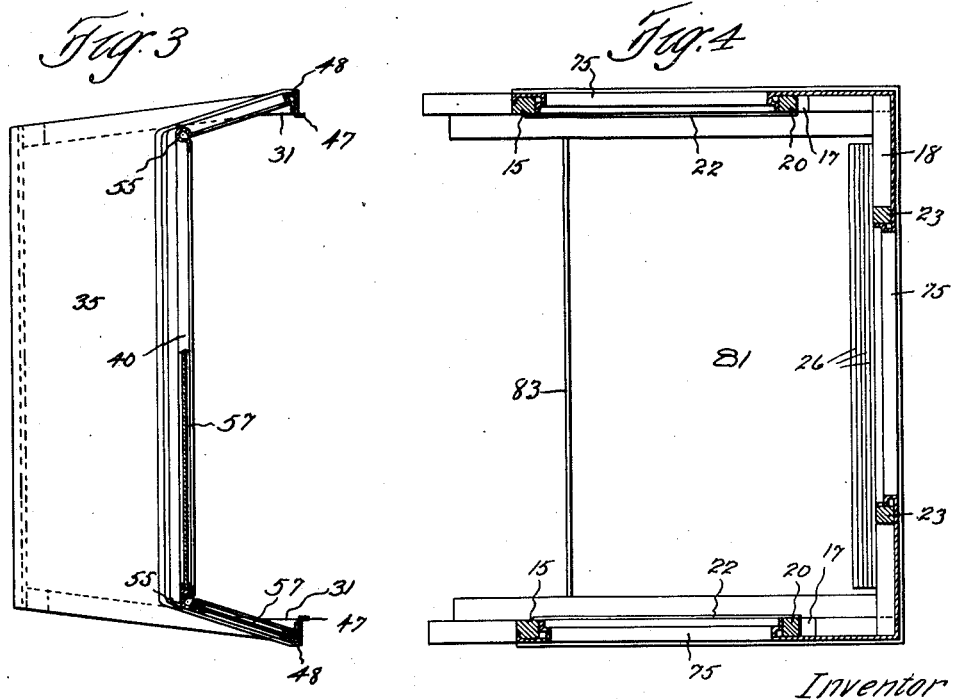
Inventor
William J. Seelinger
By Hull, Brock & West
Attys.

April 21, 1925.
W. J. SEELINGER
VEHICLE BODY CONSTRUCTION
Filed June 2, 1921    4 Sheets-Sheet 3
1,534,814
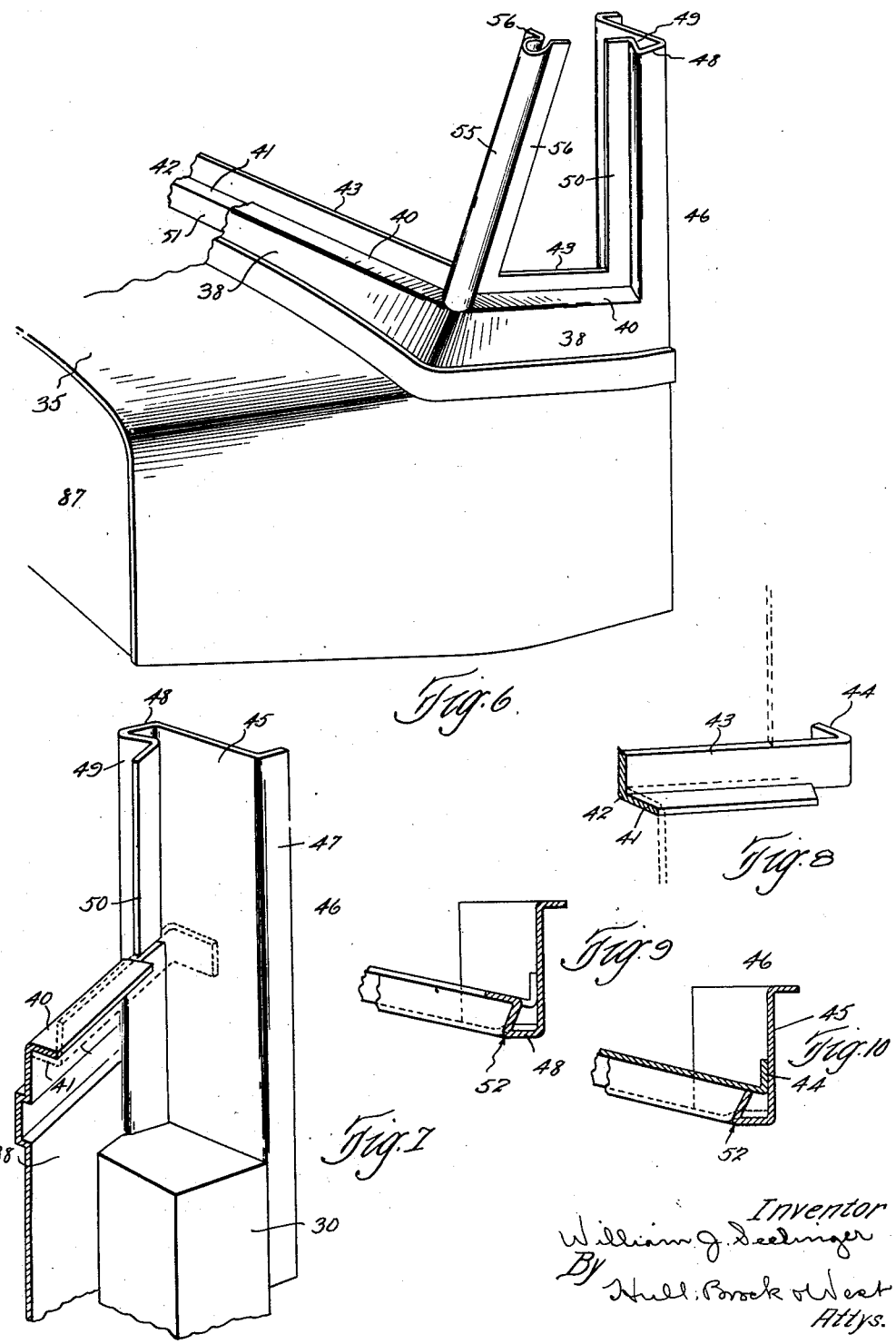

April 21, 1925.
W. J. SEELINGER
1,534,814
VEHICLE BODY CONSTRUCTION
Filed June 2, 1921   4 Sheets-Sheet 4
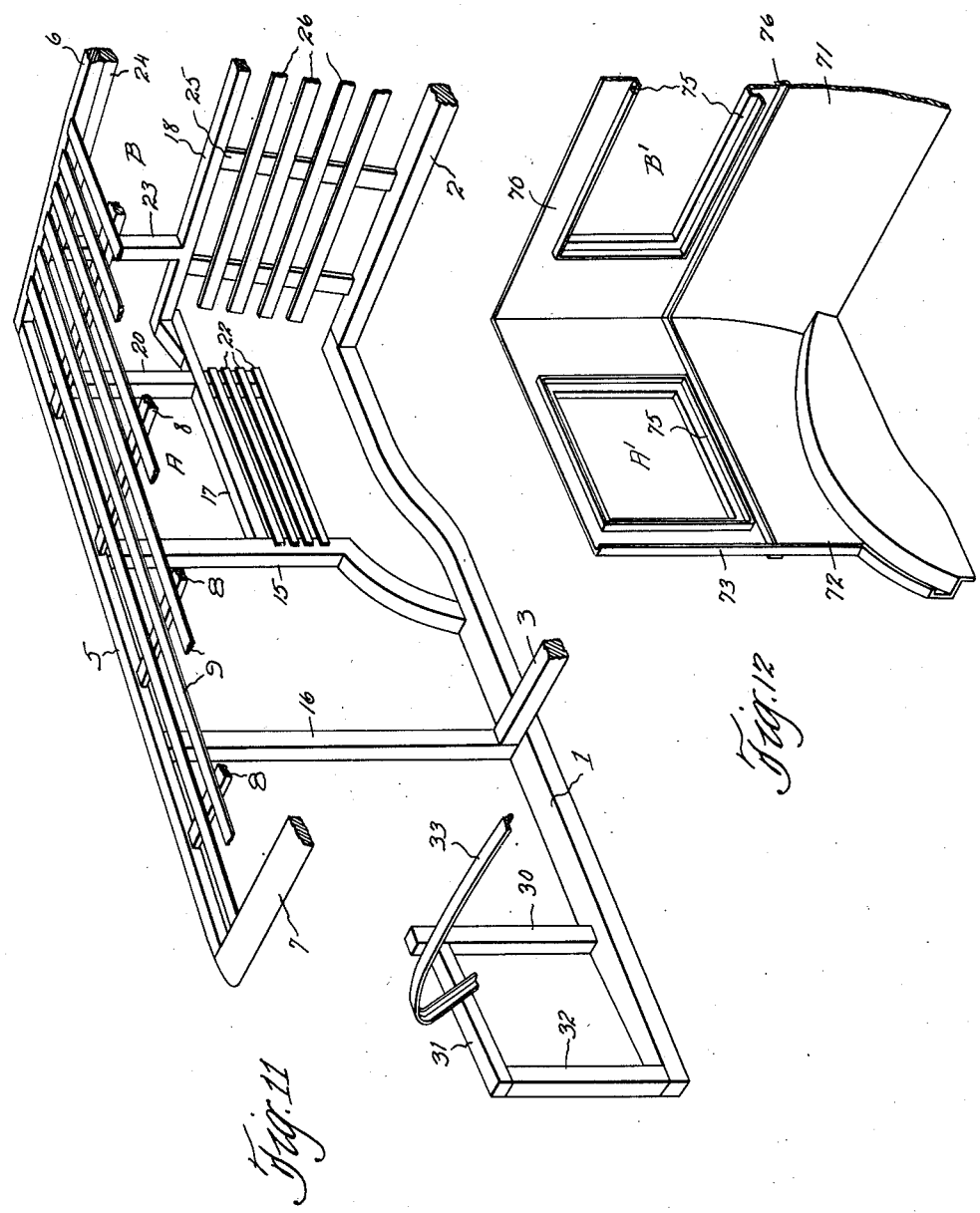
Inventor
William J. Seelinger
By Hull, Brock & West
Attys.

Patented Apr. 21, 1925.

1,534,814

UNITED STATES PATENT OFFICE.

WILLIAM J. SEELINGER, OF CLEVELAND, OHIO, ASSIGNOR TO THE OHIO BODY & BLOWER COMPANY, OF CLEVELAND, OHIO, A CORPORATION OF OHIO.

VEHICLE-BODY CONSTRUCTION.

Application filed June 2, 1921. Serial No. 474,423.

*To all whom it may concern:*

Be it known that I, WILLIAM J. SEELINGER, a citizen of the United States, residing at Cleveland, in the county of Cuyahoga and State of Ohio, have invented a certain new and useful Improvement in Vehicle-Body Constructions, of which the following is a full, clear, and exact description, reference being had to the accompanying drawings.

This invention relates to vehicle body construction, and more particularly to closed automobile bodies of the so-called sedan and coupé types.

While closed automobile bodies are continually growing in favor, their comparatively high cost and excessive weight have in the past made them prohibitive with the average automobile owner.

The objects of my invention are to so reduce the cost of production of the closed body as to make it little more expensive than open bodies of the so-called touring and roadster type; and to so reduce its weight as to cause no appreciable increase in tire expense or fuel consumption over that experienced in the use of open bodies.

In the attainment of these objects I construct the body frame of as few parts as practicable, and I apply to this frame a minimum number of shells to complete the body, each shell consisting of sections welded together so as to form in effect an integral unit. Thus a saving is effected in both labor and material.

A further object of the invention is to provide a light, comparatively inexpensive and substantial windshield construction for incorporation in closed bodies and which serves the purpose of supporting the front portion of the top, thus obviating the need of heavy posts which are usual at the front corners of closed bodies.

The foregoing objects, and others which will appear as this description proceeds, are attained in the embodiment of my invention illustrated in the drawings accompanying and forming a part hereof and wherein Fig. 1 is a central vertical longitudinal section through an automobile body constructed in accordance with my invention, the seats, upholstery, doors, and other parts which constitute no part of my invention being omitted; Fig. 2 is a transverse vertical section through the rear portion of the body as indicated by the line 2—2 of Fig. 1 and looking in the direction of the arrows; Figs. 3 and 4 are horizontal sections on the lines 3—3 and 4—4, respectively, of Fig. 1; Fig. 5 is a sectional detail through one of the window frames; Fig. 6 is a fragmentary perspective view of the front end construction; Fig. 7 is a detail in perspective of one of the front corner posts; Fig. 8 is a similar view of certain of the elements included in Fig. 7; Figs. 9 and 10 are horizontal sections through the corner post; Fig. 11 is a fragmentary perspective view of the body frame; and Fig. 12 is a similar view of the rear body shell.

The base of the body frame is made up of side members 1, connected at their rear ends by a cross member 2 and intermediate their ends by a similar member 3. The side members 1 are made to conform to the chassis whereon the body is to be mounted. The top is constructed of side members 5 that are connected at the rear by a cross member 6, at the front by a cross member 7, and at suitably spaced points between the ends by cleats 8 which support strips 9. The top is supported from the base by door posts 15 and 16, the former being the rear posts and having their lower ends curved forwardly and formed to the arcuate indentations of the body shell which accommodate the inner edge of the fenders when the body is completed. The door posts 16 are shown as in the same vertical plane with the cross member 3 of the base. Frame members 17 extend rearwardly from the door posts 15 and are connected together at their rear ends by a cross member 18, the corners defined by the meeting ends of the members 17 and 18 being substantially in vertical alignment with the rear corners of the top. Spaced a suitable distance rearwardly of the door posts 15 are frame members 20 which depend from the top and extend a considerable distance below the frame members 17, the members 17 and 20 being mortised at their junction. Strips 22 are applied to and extend between the door posts and members 20 below the members 17 to provide supports for the body of upholstery. The top member 5 and frame members 17 and 20, on each side of the body, define window openings designated A. A window opening B is formed in the back by uprights 23 which rise from the frame member 18 and join a member 24 that is applied to the cross member 6 of the top.

Secured to cleats 25 which are supported by and between the frame member 18 and the cross member 2 of the base are strips 26 for the support of the upholstery for the back of the rear seat. A suitable distance forwardly of the door posts 16 are short corner post sections 30 which rise from the side members 1 and frame members 31 connect the post sections, near their upper ends, with posts 32 which rise from the forward ends of the base members 1. The frame members 31 are connected together by an arch shaped angle bar 33 which constitutes a support for the cowl.

The cowl 35 is composed of a member having sides which are attached at their lower edges to the base members 1 and which is arched across the angle bar 33 and secured thereto at its rear edge. The upper edge of the cowl is brazed or welded to a wall section 38 having formed therein a bead 39 which gives the appearance of the molding that is usually applied to a closed body between the cowl and the wall section immediately thereabove. The wall section 38 extends across the front, and back along the sides to the corner posts and at its upper edge is flanged inwardly at 40 over the horizontal flange 41 of a bar 42 which extends entirely about the front end of the body and has the extreme rear ends of its vertical flange 43 turned laterally as at 44 and welded or otherwise secured to the web 45 of members 46 which are secured to the upper ends of, and constitute extensions for, the post sections 30 (see Figs. 7, 9 and 10). The inner edge of each of the members 46 is turned rearwardly, as shown at 47, to constitute a door stop, and at the outer edge is turned forwardly at 48, then inwardly at an acute angle, as at 49, and thence generally in a forward direction to provide a flange 50 which joins, at its lower end, the upper edge of the flange 43 of bar 42. Across the front, the bar 42 is substantially Z-shaped, having a flange 51 that provides a bearing surface for the adjacent portion of the wall 38, while along each side the bar 42 is L-shaped. The parts 49 of members 46 terminate at their junction with the flange 40 of the wall 38, and below this plane, the rear edges of the wall 38, are turned inwardly to the rear of the portions 48 of members 46 and the parts are welded together at 52 so that, in effect, the members 46, wall 38 and cowl form an integral unit or shell. Tubular windshield members 55 are inclined upwardly and rearwardly from the forward corners of the wall 38 and have wings 56 which are in the plane of and join the flange 43 of the bar 42. The members 55 and 46 merge where they join the top; and the wings 56, flanges 43 and 50 constitute seats for the reception of framed glass panels 57 (Fig. 3) which complete the windshield.

The top of the front seat is defined by an angle bar 60 which has its ends secured to the opposed door posts 16 and is curved rearwardly between said posts. Braces 61 connect the angle bar 60 with the cross member 3. A seat supporting frame 62 is supported at its rear by the braces 61, and along each side and across the front by a plate 63 that is flanged inwardly at top and bottom, as indicated at 64 and 65, respectively. A sheet metal back 66 has its upper edge curved over and conceals the vertical flange of the angle bar 60 and extends downwardly rearwardly of the braces 61 to the floor 68, while its vertical edges are secured to the posts 16.

Applied to the rear end of the body frame is an integral shell 70 (that is made up of plates welded together prior to the application of the shell to the frame). The shell comprises a back 71 and sides 72, and the sides are adapted to be spread apart enough to engage the shell about the rear end of the frame and then brought together so that flanges 73 at the forward ends of the sides 72 may be engaged about the forward edges of the door posts 15. The shell is provided with window openings A' and B' which register with the respective openings A and B of the frame, and about the edges of the openings A' and B' the shell is formed to provide seats 75 for glass panes or panels 76 that may be held in place by cleats 77.

The shell has bearings on the frame about the rear ends of the base and top, and along the door posts 15 and the frame members 17 and 18. The shell is provided with a bead 76 in the plane of the bead 39 of the cowl, and besides imparting the appearance of a molding applied to the rear end of the body, the bead has the additional function of strengthening the shell. An advantage in a unitary shell, over one made up as usual, of sections which are joined in the region of the bead and the joint covered by moulding, is that in finishing the body the work is greatly facilitated. In the common built-up structure the molding has to be applied very neatly and securely, and notwithstanding the care and skill with which it is applied, the molding fails to make the joint sufficiently tight to preclude the entrance of rain or moisture and to prevent the leakage of paint when the body is painted on the inner side, and in the process of painting, the paint leaks through and runs down on the outer side and causes the finisher considerable trouble and loss of time.

The rear seat 81 extends forwardly from the cross member 2 and is supported at its forward end a suitable distance above the floor 68 by a vertical cross piece 82. An angle bar 83 is applied to the front edge of the seat and its vertical flange projects thereabove to form a stop for the cushion. Forwardly of the front seat are the usual footboards 85, and toe boards 86 which join a head 87 that is set into the front of the cowl and against the posts 32. A suitable covering 90 is applied to the top.

From the foregoing description, it will be seen that my invention provides a very substantial, yet light and comparatively inexpensive vehicle body of the closed type.

Having thus described my invention, what I claim is:

1. In a vehicle body construction, the combination of a frame comprising a base, a top, door posts connecting the base and top, horizontal frame members extending rearwardly from the door posts and across the back, vertical frame members depending from the top and crossing the horizontal frame members and extending to a point adjacent the base, said vertical and horizontal frame members cooperating with the door posts and top to produce window openings, strips extending between and connected to the door posts and the lower portions of the vertical frame members to provide a base for upholstery; and an integral shell applied to the frame and extending from base to top, across the back and along each side and having its front edges connected to the door posts, said shell having window openings registering with those of the frame.

2. In a vehicle body construction, the combination of a frame comprising a base, a top, opposed door posts extending from base to top, a curved bar having its ends connected to the opposed door posts, braces extending from the bar to the base, a seat frame having its rear edge connected to the braces between the door posts, a vertical plate supporting the seat frame along the front, and a back plate having its upper edge secured to the bar and depending rearwardly of the braces to the base.

3. In a vehicle body construction, the combination of a frame comprising a base, a top, opposed door posts extending from base to top, a curved bar having its ends connected to the opposed door posts and curved rearwardly therebetween, braces extending from the bar to the base, a seat frame having its rear edge connected to the braces between the door posts, a vertical plate supporting the seat frame along the sides and across the front, and a back plate having its upper edge secured to the bar and depending rearwardly of the braces to the base, the vertical edges of the last mentioned plate joining the door posts.

4. In a vehicle body construction, the combination of a base, a top, opposed door posts extending from base to top, an angle bar having its ends connected to the door posts and curved rearwardly therebetween, the angle bar having a substantially vertical flange which rises from the rear edge of a horizontal flange thereof, braces extending from the angle bar to the base, a seat support having its rear edge connected to the braces between the door posts, a vertical plate sustaining the support at its forward edge, and a back plate having its upper edge curled over the vertical flange of the angle bar and depending therefrom rearwardly of the braces to the base.

5. In a vehicle body construction, the combination of a body frame having front corner posts, a bar extending forwardly from said posts and across the front, said bar having horizontal and substantially vertical flanges, a cowl shell applied to the frame and having a flange overlying and attached to the horizontal flange of the bar, tubular members extending upwardly from the bar and having side wings in the plane of and joining the vertical flange of the bar, and window panels seating upon said wings and flange and upon portions of the corner posts.

6. In a vehicle body construction, the combination of a frame comprising a base, a top, front corner posts extending from the base to the top, vertical frame members spaced forwardly of the corner posts, horizontal frame members connecting the upper ends of the vertical members to parts of the corner posts intermediate their ends, a bar connected to and arched upwardly between the horizontal frame members, a second bar having its ends connected to the corner posts and extending forwardly therefrom and across the front above and to the rear of the former bar, a cowl shell applied to the frame and bearing upon the first mentioned bar and extending upwardly therefrom and having its top edge flanged over the second mentioned bar, and windshield frame members rising from the last mentioned bar and joining the top adjacent the upper ends of the corner posts.

7. In a vehicle body construction, the combination of a body frame comprising a base and top, and front corner posts extending from the base to the top, vertical frame members rising from the base forwardly of the corner posts, horizontal frame members connecting the upper ends of the last mentioned frame members to parts of the corner posts intermediate their ends, a cowl support connected to and arched upwardly between the horizontal frame members, a bar having its ends connected to the corner posts and extending forwardly therefrom and across the front above the plane of the cowl support, said bar having a horizontal flange, and substantially vertical flanges depending and rising respectively from the front and rear edges of the horizontal flange, a cowl shell applied to the frame and bearing upon the cowl support and having its upper edge flanged over the horizontal flange of the bar with the part adjacent thereto bearing upon the depending flange of the bar, and tubular frame members rising from the bar and having wings in the plane of and joining the vertical flange of the bar while the body portions of the tubular members bear upon the inturned edge of the cowl.

8. In a vehicle body construction, the combination of a body frame comprising a base, a top, and front corner post sections rising from the base, vertical frame members rising from the base forwardly of the corner post sections, horizontal frame members connecting the upper ends of the vertical frame members with the upper end portions of the corner post sections, a cowl support connected to and arched upwardly between the horizontal frame members, sheet metal post sections rising from the former corner post sections and joining the front corners of the top, a bar having its ends connected to the sheet metal post sections and extending forwardly therefrom and across the front above the plane of the cowl support, said bar having a substantially vertical flange extending throughout its entire length with the ends thereof turned laterally and attached to web portions of the sheet metal corner post sections, said latter corner post sections having forwardly directed flanges in the plane of and joining at their lower ends the vertical flanges of the bar, the bar having a horizontal flange extending between the flanges of the sheet metal post sections, a cowl shell applied to the frame and bearing upon the cowl support and extending thereabove and having its upper edge turned over and connected to the horizontal flange of the bar, the bar having a depending flange whereon the adjacent portion of the cowl bears, and tubular frame members bearing upon the turned over edge portion of the cowl and extending therefrom to the top, the tubular frame members having side flanges in the plane of and joining, at their lower ends, the vertical flange of the bar, and, at their upper ends, the flanges of the sheet metal corner post sections.

9. A windshield structure for vehicle bodies comprising flanged uprights, a bar having its ends connected to the uprights and extending forwardly therefrom and across the front, said bar having a substantially vertical flange and a horizontal flange extending forwardly from the lower edge of the vertical flange, and tubular frame members bearing at their lower ends upon the horizontal flange of the bar and having side flanges in the plane of and joining, at their lower ends, the vertical flange of the bar, and, at their upper ends, the flanges of the uprights, thereby to provide seats for windshield panels.

In testimony whereof, I hereunto affix my signature.

WILLIAM J. SEELINGER.